US010611519B2

(12) United States Patent
Frazier

(10) Patent No.: US 10,611,519 B2
(45) Date of Patent: Apr. 7, 2020

(54) UNIVERSAL PLATFORM FOR STACKING AN OBJECT ON TOP OF A BULK BIN

(71) Applicant: STAY-RITE SOLUTIONS LLC, Cartersville, GA (US)

(72) Inventor: Clayton Anthony Frazier, Rydal, GA (US)

(73) Assignee: STAY-RITE SOLUTIONS LLC, Rydal, GA (US)

(*) Notice: Subject to any disclaimer, the term of this patent is extended or adjusted under 35 U.S.C. 154(b) by 470 days.

(21) Appl. No.: 15/346,351

(22) Filed: Nov. 8, 2016

(65) Prior Publication Data

US 2017/0129646 A1    May 11, 2017

Related U.S. Application Data

(60) Provisional application No. 62/253,369, filed on Nov. 10, 2015.

(51) Int. Cl.
*B65D 21/02* (2006.01)
*B65D 19/00* (2006.01)
*B65D 19/44* (2006.01)

(52) U.S. Cl.
CPC ..... *B65D 21/0224* (2013.01); *B65D 19/0004* (2013.01); *B65D 19/44* (2013.01); *B65D 2519/00965* (2013.01)

(58) Field of Classification Search
CPC ............ B65D 21/0224; B65D 19/0004; B65D 19/44; B65D 2519/00965; B65D 9/24
(Continued)

(56) References Cited

U.S. PATENT DOCUMENTS 2,203,625 A    6/1940   Friedel
2,738,564 A    3/1956   Guinane
(Continued)

FOREIGN PATENT DOCUMENTS

DE    202007011002 U1    12/2007
EP         0034464 A1     8/1981
(Continued)

OTHER PUBLICATIONS

"Corner Clips Improve Corrugated-Box Handling," Metal Forming Magazine, metalforming magazine.com, 2008, http://www.metalformingmagazine.com/magazine/article.asp?aid=4943, 2 pages.
(Continued)

*Primary Examiner* — Jacob K Ackun
*Assistant Examiner* — Jenine Pagan
(74) *Attorney, Agent, or Firm* — Klintworth & Rozenblat IP LLP

(57) ABSTRACT

A platform enables a bulk bin to have an object stacked thereupon, such as a pallet or another bulk bin. The platform includes first and second pairs of legs extending downwardly from a top wall. An upper planar surface of the top wall is devoid of any protrusions which extend thereabove. An outer leg of each pair is spaced from an inner leg of each pair, the outer and inner legs in each pair are parallel to each other, and each of the outer and inner legs extend at a 45-degree angle, or about a 45-degree angle, relative to a centerline of the platform. The platform is placed on an upper rim of the bulk bin such that the side wall(s) of the bulk bin are between the respective legs.

22 Claims, 12 Drawing Sheets

(58) Field of Classification Search
USPC .............. 206/504, 512, 503; 108/51.11, 51.3, 108/53.1–53.5, 157.15, 157.16, 157.17, 108/159, 42
See application file for complete search history.

(56) References Cited

U.S. PATENT DOCUMENTS

| | | | |
|---|---|---|---|
| 3,071,277 A * | 1/1963 | Olson | B65D 9/24 217/12 R |
| 3,480,178 A | 11/1969 | Morgan | |
| 3,651,977 A | 3/1972 | Morgan | |
| 3,760,465 A | 9/1973 | Brennan | |
| D238,862 S | 2/1976 | Hewson | |
| 3,944,073 A * | 3/1976 | Downing | B65D 21/0224 206/503 |
| 4,089,417 A | 5/1978 | Osborne | |
| 4,126,265 A | 11/1978 | Holmes | |
| 4,210,274 A | 7/1980 | Leonard | |
| 4,449,662 A | 5/1984 | Okamura et al. | |
| 4,509,433 A | 4/1985 | Farr | |
| 4,619,365 A * | 10/1986 | Kelly | B65D 5/006 206/503 |
| 4,779,751 A | 10/1988 | Munroe | |
| 4,787,553 A * | 11/1988 | Hoskins | B65D 5/006 206/503 |
| 4,807,756 A | 2/1989 | Young et al. | |
| 5,036,979 A * | 8/1991 | Selz | B65D 19/20 206/386 |
| 5,037,027 A | 8/1991 | Nichols | |
| D322,705 S | 12/1991 | Rasmussen | |
| 5,178,275 A | 1/1993 | Fitzgerald et al. | |
| 5,295,632 A | 3/1994 | Zink et al. | |
| D347,509 S | 5/1994 | Junaedi | |
| 5,337,950 A | 8/1994 | Bower | |
| 5,431,336 A | 7/1995 | Clee | |
| 5,531,326 A | 7/1996 | Hummel et al. | |
| 5,732,434 A | 3/1998 | McCarty | |
| 6,305,599 B2 | 10/2001 | Tsubaki et al. | |
| D455,266 S | 4/2002 | Bradford | |
| 6,368,694 B1 | 4/2002 | Marsh et al. | |
| D463,894 S | 10/2002 | Ghafourian et al. | |
| 6,564,993 B1 | 5/2003 | Wassink | |
| 6,926,144 B1 | 8/2005 | Schnaars, Jr. et al. | |
| D539,004 S | 3/2007 | Giampavolo | |
| D547,024 S | 7/2007 | Brefka et al. | |
| 7,244,004 B2 | 7/2007 | Hightower | |
| D620,673 S | 7/2010 | Giampavolo et al. | |
| 7,963,394 B2 | 6/2011 | Facey et al. | |
| D648,094 S | 11/2011 | Medina | |
| D657,934 S | 4/2012 | Kessler et al. | |
| 8,333,297 B2 | 12/2012 | McAlpine et al. | |
| D681,903 S | 5/2013 | Randall et al. | |
| D706,014 S | 5/2014 | Ksiezakowski | |
| 8,915,390 B2 * | 12/2014 | Meyer-Horn | B65D 9/12 206/600 |
| 9,079,707 B2 | 7/2015 | Winterberg | |
| D773,299 S | 12/2016 | Gray et al. | |
| D774,271 S | 12/2016 | Marti | |
| D813,489 S | 3/2018 | Frazier | |
| 2002/0179701 A1 | 12/2002 | Bazany et al. | |
| 2004/0025757 A1 | 2/2004 | Fan | |
| 2013/0186889 A1 * | 7/2013 | Meyer-Horn | B65D 9/12 220/1.5 |
| 2014/0021090 A1 * | 1/2014 | Meyer-Horn | B65D 9/24 206/600 |
| 2017/0129646 A1 | 5/2017 | Frazier | |

FOREIGN PATENT DOCUMENTS

| | | |
|---|---|---|
| EP | 0665166 A1 | 2/1995 |
| EP | 1207113 A1 | 5/2002 |
| EP | 1886928 A1 | 2/2008 |
| WO | 00/41938 A1 | 7/2000 |
| WO | 02/072437 A1 | 9/2002 |

OTHER PUBLICATIONS

"K-Bins Flat Pack Polypropylene Stacking Boxes Grey," Big Dug®, bigdug.co.uk, © 2015, accessed: Jul. 2015. http://www.bigdug.co.uk/storage-boxes-containers-c363/k-bins-c367/kbins-flat-packpolypropylene-stacking-boxes-grey-pp14828, 2 pages.
International Search Report and Written Opinion for PCT/US16/60994 dated Jan. 25, 2017, 11 pages.

* cited by examiner

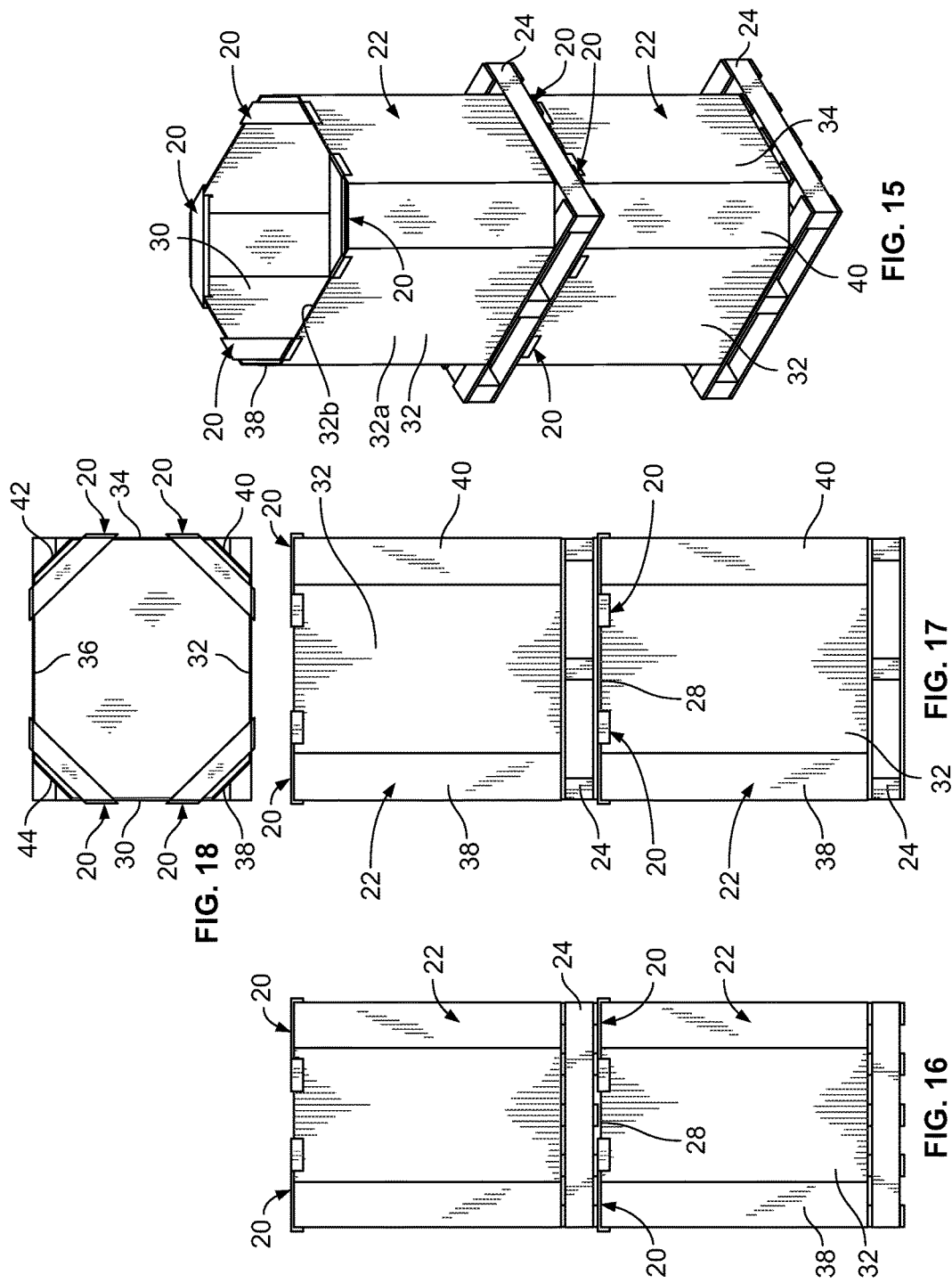

UNIVERSAL PLATFORM FOR STACKING AN OBJECT ON TOP OF A BULK BIN

This application claims the domestic priority of U.S. provisional application Ser. No. 62/253,369, filed on Nov. 10, 2015, the contents of which are incorporated herein in its entirety.

FIELD OF THE DISCLOSURE

The present disclosure relates to a platform which enables a bulk bin to have an object stacked on top of the bulk bin, such as a pallet or another bulk bin stacked directly on the platform.

BACKGROUND

Bulk bins which are reusable are useful for the transportation and storage of goods. Such bulk bins must be of sufficiently rigid construction to enable safe and damage free transport and storage of the goods contained therein. These bulk bins are commonly stacked on top of each other during transportation or storage. Generally, the bulk bins are made of materials, such as corrugated paperboard, which are not sufficiently rigid to support a number of filled tote boxes in stacked relation. In order to be stackable, the upper edge of the bulk bin is typically reinforced with an upper rail or rim member which is adapted to receive a pallet or another bulk bin stacked thereupon.

Such an upper rail or rim member assists in preventing the mild to severe degradation or ultimate failure of the upper rim of the bulk bin. Degradation or failure of the upper rim of the bulk bin occurs when the pallet or another bulk bin rubs, shakes, slides, or through repeated contact, and begins to break down the upper rim of the lower bulk bin, resulting in either partial or total failure of the upper rim of the lower bulk bin, prohibiting further use of the bulk bin in a multi-stacking organization.

SUMMARY

A platform which enables a bulk bin to have an object stacked on top of the bulk bin, such as a pallet or another bulk bin, in accordance with some example embodiments includes a top wall, a first pair of legs extending downwardly from a top wall, and a second pair of legs extending downwardly from the top wall. The top wall has an inner edge, an opposite outer edge, opposite first and second side edges which extend between the inner edge and the outer edge, an upper planar surface defined between the edges, an opposite lower surface defined between the edges, a first centerline extending between the inner and outer edges, a second centerline extending between the side edges, the first centerline being transverse to the second centerline, wherein the upper planar surface is devoid of any protrusions which extend thereabove. The first pair of legs are defined by a first outer leg and a first inner leg extending downwardly from the lower surface of the top wall, the first outer leg being spaced from the first inner leg, the first outer and inner legs being parallel to each other, each of the first outer leg and the first inner leg extending at a 45-degree angle, or about a 45-degree angle, relative to the first centerline. The second pair of legs are defined by a second outer leg and a second inner leg extending downwardly from the lower surface of the top wall, the second outer leg being spaced from the second inner leg, the second outer and second legs being parallel to each other, each of the second outer leg and the second inner leg extending at a 45-degree angle, or about a 45-degree angle, relative to the first centerline. The first inner leg and the second inner leg are proximate to each other, but spaced apart from each other. The platform is placed on an upper rim of the bulk bin such that the side wall(s) of the bulk bin are between the legs of the platform.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which:

FIG. 15 is a perspective view of the bulk bin of FIG. 13 having a plurality of universal platforms mounted thereon, and in a stacked arrangement with a pallet and another bulk bin mounted thereon;

FIG. 16 is a first side elevational view of the stacked bulk bins of FIG. 13;

FIG. 17 is a second side elevational view of the stacked bulk bins of FIG. 13;

FIG. 18 is a top plan view of the stacked bulk bins of FIG. 13;

DETAILED DESCRIPTION

Figure 1:
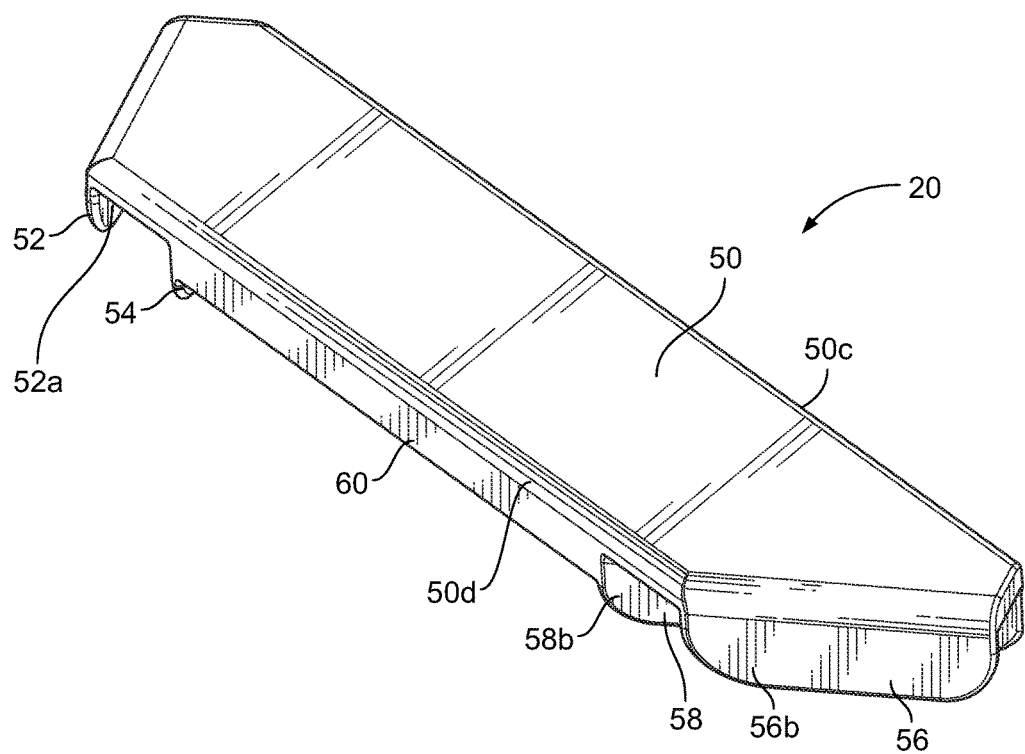
FIG. 1 is a top perspective view of an embodiment of a universal platform.
Figure 2:
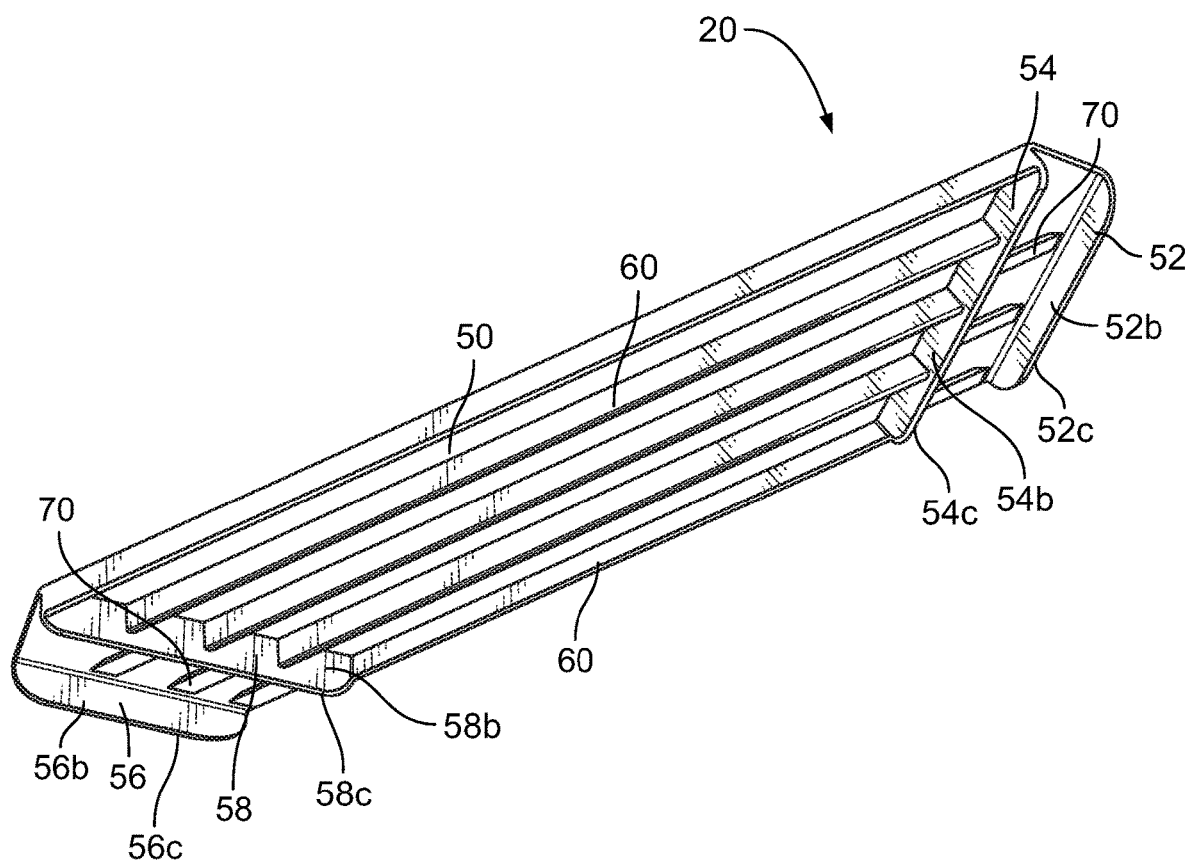
FIG. 2 is a bottom perspective view of an embodiment of the universal platform.
Figure 3:
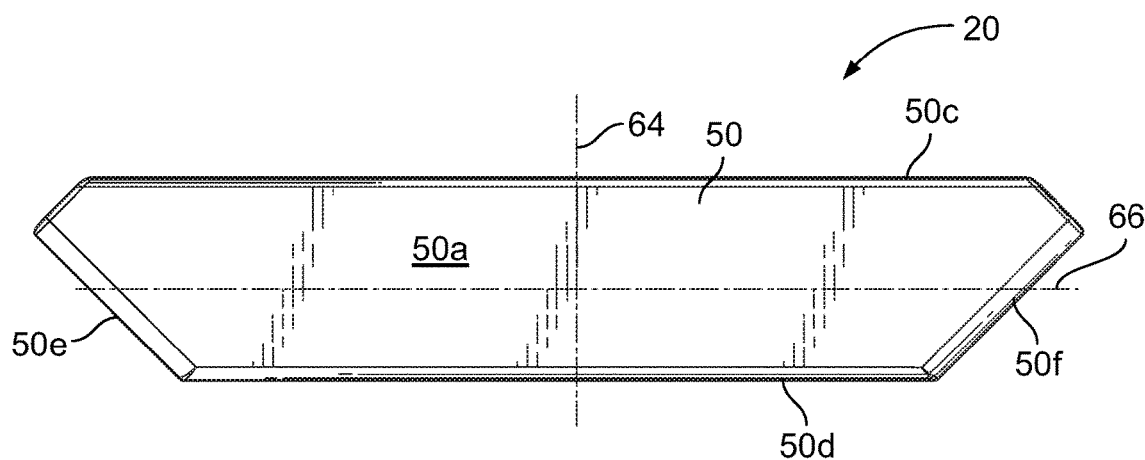
FIG. 3 is a top plan view of the universal platform.
Figure 4:
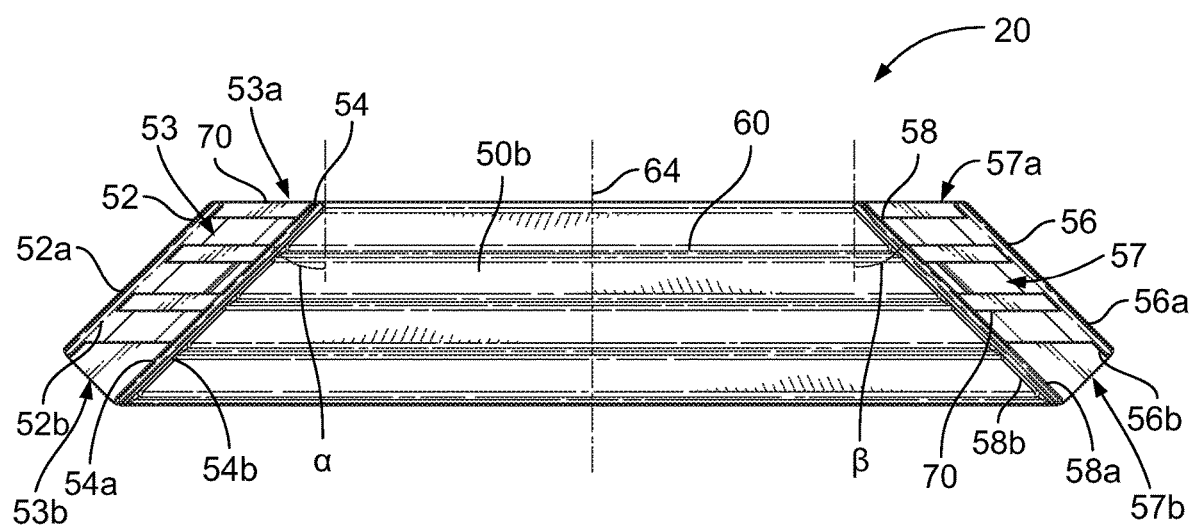
FIG. 4 is a bottom plan view of the universal platform.
Figure 5:
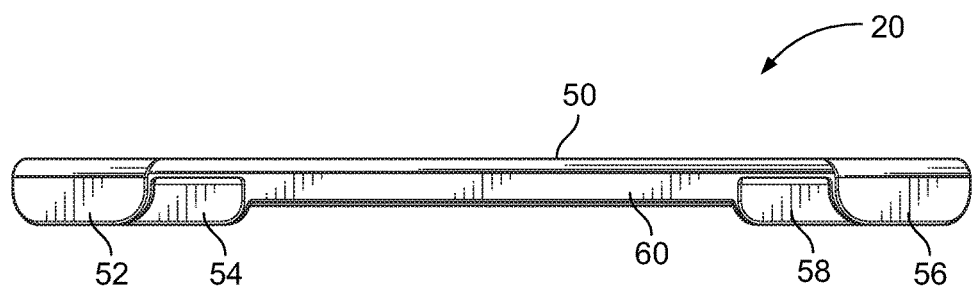
FIG. 5 is an outer elevation view of the universal platform.
Figure 6:
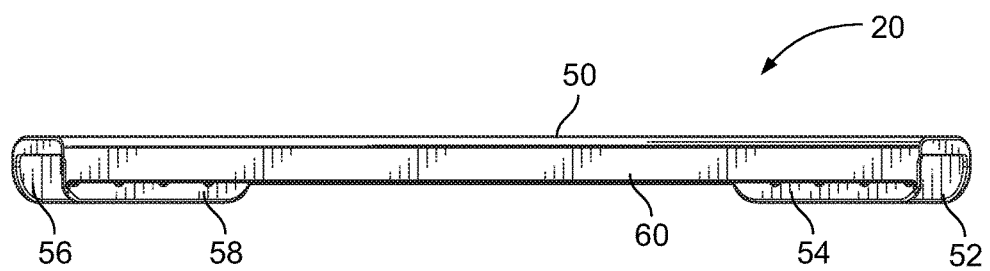
FIG. 6 is an inner elevation view of the universal platform.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

A universal platform 20 is provided which enables a bulk bin 22, 122 to have a pallet stacked on top of the bulk bin 22, 122. Another bulk bin may be stacked on top of the pallet. Alternatively, another bulk bin ("upper bulk bin") may be directly stacked on top of the universal platform 20. The upper bulk bin may be of similar or dissimilar construction to the lower bulk bin 22, 122. The pallet or the upper bulk bin is defined herein as object 24. While the term "bulk bin" is used herein, it is to be understood that this means any open topped bin, tote, box, drum, barrel, etc.

The universal platform 20 is removably mounted on an open top end 26, 126 of the bulk bin 22, 122 to allow the object 24 to be positioned on top of the universal platform 20. More than one universal platform 20 may be removably mounted on the open top end 26, 126 of the bulk bin 22, 122. The universal platform 20 functions as a platform between an upper rim 28, 128 of the bulk bin 22, 122 and the contacting object 24 which is stacked on top of the lower bulk bin 22, 122.

The universal platform 20 prevents a smaller object 24 stacked on the lower bulk bin 22, 122 from descending into the lower bulk bin 22, 122. Conversely, a larger object 24 may be placed on the universal platform 20. The universal platform 20 provides stacking ability and stability in a vertical stacking position, or anti-stacking action/function. The universal platform 20 allows the stacking of several objects 24 pursuant to its maximum load bearing capability, or height restrictions of multiple stacked bulk bins. One or more universal platforms 20 may be removably mounted to an either full or empty bulk bin 22, 122.

Figure 20:
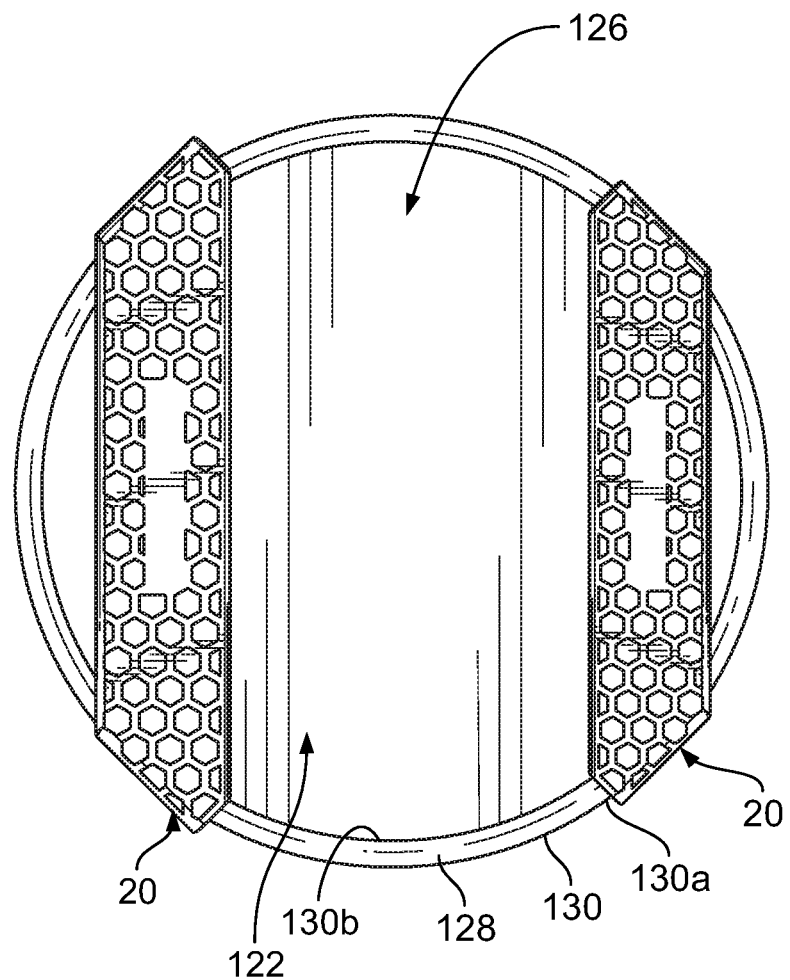
FIG. 20 is a top plan view of an example embodiment of an alternate bulk bin having a plurality of universal platforms mounted thereon, the universal platforms incorporating the features of the present disclosure.

Such a bulk bin 22, 122 is used for packing bulk items for shipping, storage and/or handling purposes. The bulk bin 22, 122 comes in different sizes, strengths and load capacities. In an embodiment, the bulk bin 22, 122 is made from corrugated fiberboard or cardboard and may be double-walled or multi-walled. The corrugated fiberboard or cardboard provides greater strength than a traditional cardboard box and can hold up to a ton or more. In an embodiment, the bulk bin 22 is a traditional square or rectangular box having four side walls, a bottom wall connecting the side walls together, and the open top end 26. Two of the side walls are parallel to each other; and the remaining two side walls are parallel to each other and transverse to the side walls. A representative bulk bin 22 and object 24 which is shown as a pallet are shown in FIGS. 13-19. In addition to the four side walls 30, 32, 34, 36 of the traditional square or rectangular box, four corner side walls 38, 40, 42, 44 may be provided and are respectively provided between adjacent side walls 30, 32, 34, 36. The corner side walls 38, 40, 42, 44 are angled relative to the respective side walls 30, 32, 34, 36 to form an octagonal shape. In an embodiment, the corner side walls 38, 40, 42, 44 extend at a forty-five degree angle relative to the respective side walls 30, 32, 34, 36. The bottom ends of the walls 30-36 or 30-44 are closed by a bottom wall 46. Such bulk bins 22 are commonly known as Gaylord containers. Each side wall 38-44 has an outer surface and an inner surface which faces each other. As used herein, the outer surfaces of the side walls 38-44 are labeled with an "a" after the reference numeral and the inner surfaces of the side walls 38-44 are labeled with a "b" after the reference numeral. The top end 26 of the bulk bin 22 is open and defines the upper rim 28 formed by the side walls 30-36 or side walls 30-44. In an embodiment as shown in FIG. 20, the bulk bin 122 is a barrel or drum having a circular side wall 130, a bottom wall (not shown) closing the bottom end of the side wall 130, and an open top end 126; the top end 126 defines the upper rim 128 formed by the side wall 130.

The universal platform 20 attaches to the upper rim 28, 128 of the bulk bin 22, 122. The universal platform 20 is formed from a top wall 50, a first pair of legs 52, 54 which extend downwardly from the top wall 50, a second pair of legs 56, 58 which extend downwardly from the top wall 50, and a plurality of stiffening ribs 60, 60'. In an embodiment, the top wall 50 and the legs 52, 54, 56, 58 are integrally formed of one-piece.

Figure 7:
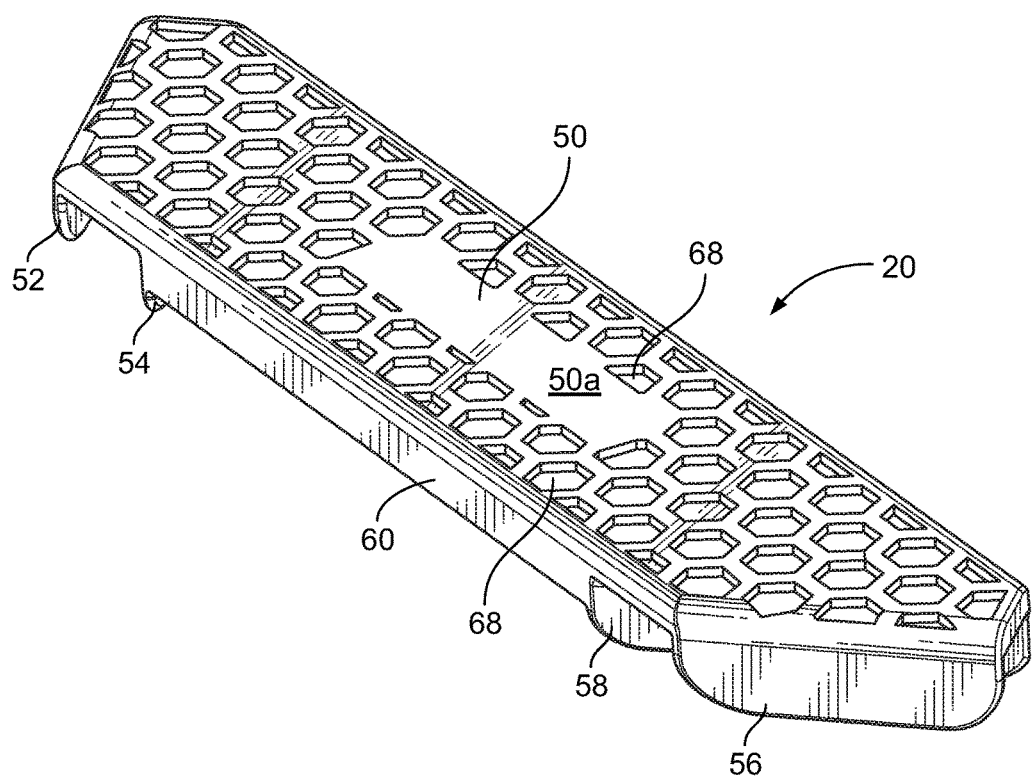
FIG. 7 is a top perspective view of an embodiment of the universal platform.
Figure 8:
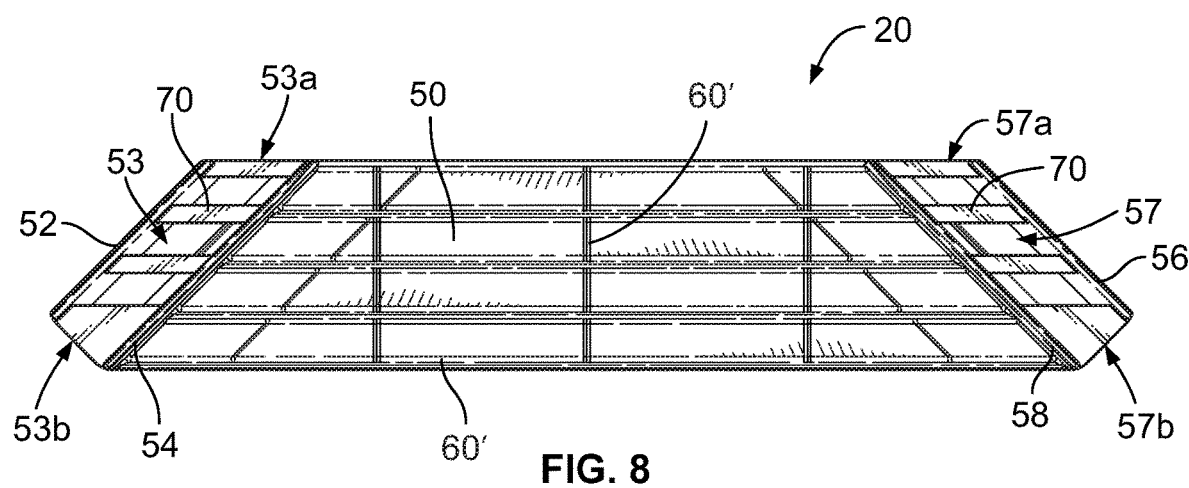
FIG. 8 is a bottom perspective view of an embodiment of the universal platform.
Figure 9:
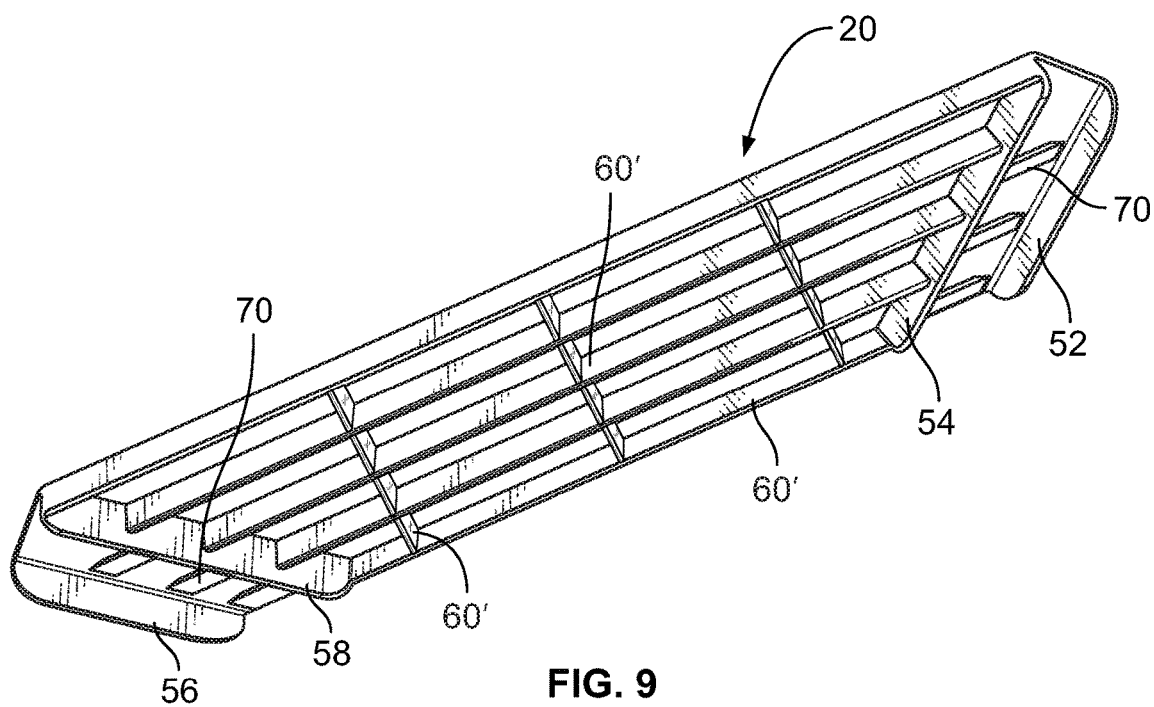
FIG. 9 is a bottom plan view of the universal platform of FIG. 8.
Figure 10:
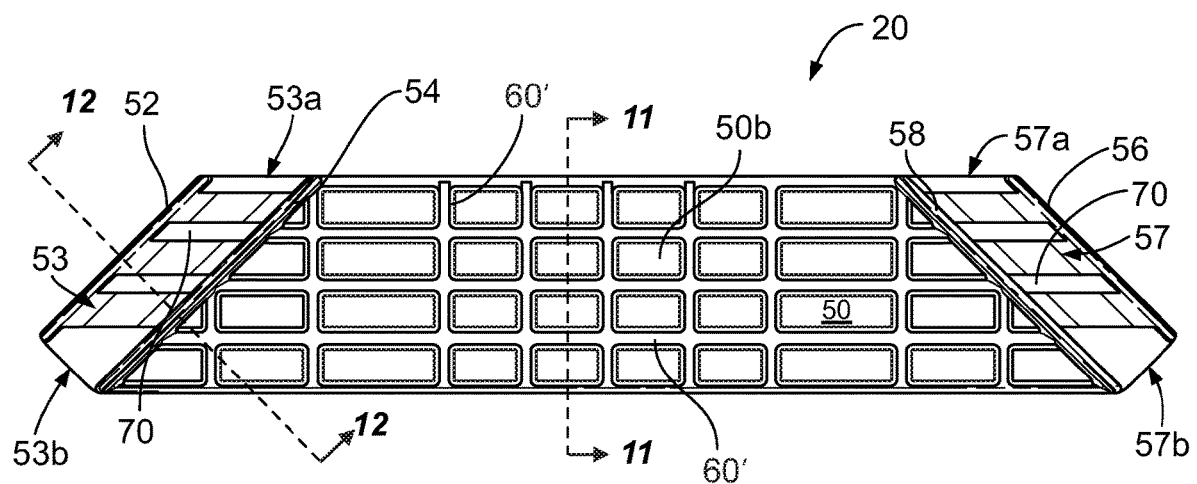
FIG. 10 is a bottom plan view of an embodiment of the universal platform.
Figure 11:
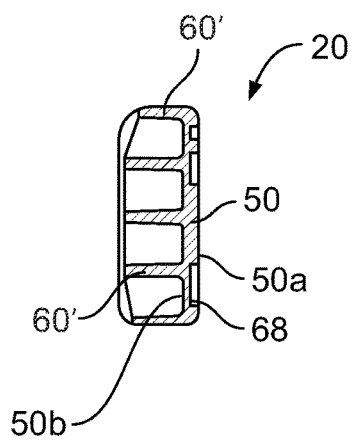
FIG. 11 is a cross-sectional view along line 10-10 of FIG. 10.
Figure 12:
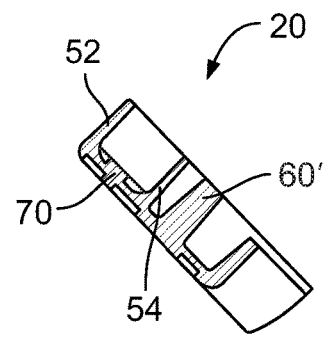
FIG. 12 is a cross-sectional view along line 11-11 of FIG. 10.

The top wall 50 has an upper surface 50a, an opposite lower surface 50b, an inner edge 50c, an opposite outer edge 50d, and opposite side edges 50e, 50f which extend between the inner edge 50c and the outer edge 50d. A first centerline 64 divides the universal platform 20 in half and extends between the inner and outer edges 50c, 50d. A second centerline 66 divides the universal platform 20 in half and extends between the side edges 50e, 50f. The first centerline 64 is transverse to the second centerline 66. The upper surface 50a falls along a planar plane. Since the upper surface 50a of the top wall 50 is planar, the upper surface 50a is devoid of any lips, protrusions and the like which extend above the upper surface 50a. The upper surface 50a may be formed as a flat as shown in FIGS. 1, 3, 5 and 6. The upper surface 50a may have a series of depressions or dimples 68 therein, see FIG. 7, provided the remainder of the upper surface 50a falls along the planar plane. The dimples 68 reduce the weight of the universal platform 20 and may provide for geometrical stiffening of the universal platform 20. In an embodiment, the dimples 68 are hexagonal. The upper surface 50a may be formed as a series of bumps (not shown), with the upper ends of the bumps forming the planar upper surface 50a. That is to say, when the object 24 is seated on the upper surface 50a of the top wall 50, the object 24 can easily slide in any direction on the upper surface 50a of the top wall 50 because the upper surface 50a of the top wall 50 does not include any structures which impede the movement of the object 24 relative to the top wall 50. In an embodiment, the side edges 50e, 50f extend at an angle, which may be a 45-degree angle, or about a 45-degree angle, relative to the first centerline 64. In an embodiment, the inner and outer edges 50c, 50d are parallel to each other, parallel to the centerline 66 and transverse to the centerline

64. In an embodiment, the top wall 50 is rectangular. The edges 50c, 50d, 50e, 50f can take a variety of shapes, for example, straight, serrated, curved, etc.

The legs 52, 54 in the first pair depend downwardly from the lower surface 50b of the top wall 50 and form an outer leg 52 and an inner leg 54. The leg 52 has an outer surface 52a, an inner surface 52b and a lower end 52c which is rounded. The leg 52 further has a first end and a second opposite end between which the surfaces 52a, 52b extend. The leg 54 has an outer surface 54a, an inner surface 54b and a lower end 54c which is rounded. The leg 54 further has a first end and a second opposite end between which the surfaces 54a, 54b extend. The outer leg 52 is spaced from the inner leg 54 by a predetermined distance to define a channel 53 therebetween having open opposite ends 53a, 53b and an open lower end which is opposite to the top wall 50, and the legs 52, 54 are parallel to each other such that the inner surface 52b of the outer leg 52 faces the outer surface 54a of the inner leg 54. The channel 53 is formed by the inner surface 52b of the outer leg 52, the outer surface 54a of the inner leg 54, and the portion of the lower surface 50b of the top wall 50 provided therebetween. The open end 53a is formed between the first ends of the outer leg 52 and the inner leg 54. The open end 53b is formed between the second ends of the outer leg 52 and the inner leg 54. Each leg 52, 54 extends at an angle α, which in an embodiment is a 45-degree angle, or about a 45-degree angle, relative to the first centerline 64. As shown, the legs 52, 54 are spaced apart from each other by 1.5 inches. Each leg 52, 54 has a predetermined height which extends between the lower end 54c and the lower surface 50b of the top wall 50. The heights of the legs 52, 54 may be the same or may differ. As shown, the outer leg 52 extends along the side edge 50e, but the outer leg 52 may be spaced from the side edge 50e.

Likewise, legs 56, 58 in the first pair depend downwardly from the lower surface 50b of the top wall 50 and form an outer leg 56 and an inner leg 58. The leg 56 has an outer surface 56a, an inner surface 56b and a lower end 46c which is rounded. The leg 56 further has a first end and a second opposite end between which the surfaces 56a, 56b extend. The leg 58 has an outer surface 58a, an inner surface 58b and a lower end 58c which is rounded. The leg 58 further has a first end and a second opposite end between which the surfaces 58a, 58b extend. The outer leg 56 is spaced from the inner leg 58 by a predetermined distance to define a channel 57 therebetween having open opposite ends 57a, 57b and an open lower end which is opposite to the top wall 50, and the legs 56, 58 are parallel to each other such that the inner surface 56b of the outer leg 56 faces the outer surface 58a of the inner leg 58. The channel 57 is formed by the inner surface 56b of the outer leg 56, the outer surface 58a of the inner leg 58, and the portion of the lower surface 50b of the top wall 50 provided therebetween. The open end 57a is formed between the first ends of the outer leg 56 and the inner leg 58. The open end 57b is formed between the second ends of the outer leg 56 and the inner leg 58. Each leg 56, 58 extends at extends at an angle β, which in an embodiment is a 45-degree angle, or about a 45-degree angle, relative to the first centerline 64. As shown, the legs 56, 58 are spaced apart from each other by 1.5 inches. Each leg 56, 58 has a predetermined height which extends between the lower end 58c and the lower surface 50b of the top wall 50. The heights of the legs 56, 58 may be the same or may differ. As shown, the outer leg 56 extends along the side edge 50f, but the outer leg 56 may be spaced from the side edge 50f.

The outer legs 52, 56 are angled relative to each other at an angle of 90 degrees. The inner legs 54, 58 are angled relative to each other at an angle of 90 degrees.

The stiffening ribs 60, 60' depend downwardly from the lower surface 50b of the top wall 50 and extend between the inner legs 54, 58. In an embodiment as shown in FIGS. 2 and 4-6, the stiffening ribs 60 are parallel to the centerline 66 and are spaced apart from each other. One stiffening rib 60 may extend along the inner edge 50c between the inner legs 54, 58, and another stiffening rib 60 may extend along the outer edge 50d between the inner legs 54, 58. Each stiffening rib 60 has a predetermined height. The heights of the stiffening ribs 60 may be the same or may differ. The heights of the stiffening ribs 60 may be the same as the legs 52, 54, 56, 58 or may differ. In embodiments as shown in FIGS. 8-12, the stiffening ribs 60' depend downwardly from the lower surface 50b of the top wall 50 and extend between the inner legs 54, 58 and form an interconnected grid having a plurality of perpendicular stiffening ribs 60'. One stiffening rib 60' of the grid may extend along the inner edge 50c between the inner legs 54, 58, and another stiffening rib 60' of the grid may extend along the outer edge 50d between the inner legs 54, 58. Each stiffening rib 60' has a predetermined height. The heights of the stiffening ribs 60' may be the same or may differ. The heights of the stiffening ribs 60' may be the same as the legs 52, 54, 56, 58 or may differ.

The universal platform 20 may be made out of wood, plastic, metal, corrugated, ceramic and/or composite material, pressed corrugated cardboard (fiber), corrugated polymer, etc. The universal platform 20 may be made by "gas-assist"/structural foam injection molding, which results in an improved rigidity to weight ratio over other platforms. The universal platform 20 may be integrally formed of a single piece, or may be formed of two or more parts which are fastened together by suitable fasteners, adhesives or welds.

In an embodiment, a plurality of spaced apart gripping protrusions 70 extend from the lower surface 50b of the top wall 50 between the legs 52, 54 and between the legs 56, 58 such that the gripping protrusions 70 extend across the channels 53, 57. In an embodiment, the gripping protrusions 70 extend parallel to the centerline 66. The gripping protrusions 70 have a height, that is the distance from lower surface 50b of the top wall 50 to a lower end 70a of the respective gripping protrusions 70 which is less than, and preferably substantially less than, the height of the legs 52, 54, 56, 58.

Figure 13:
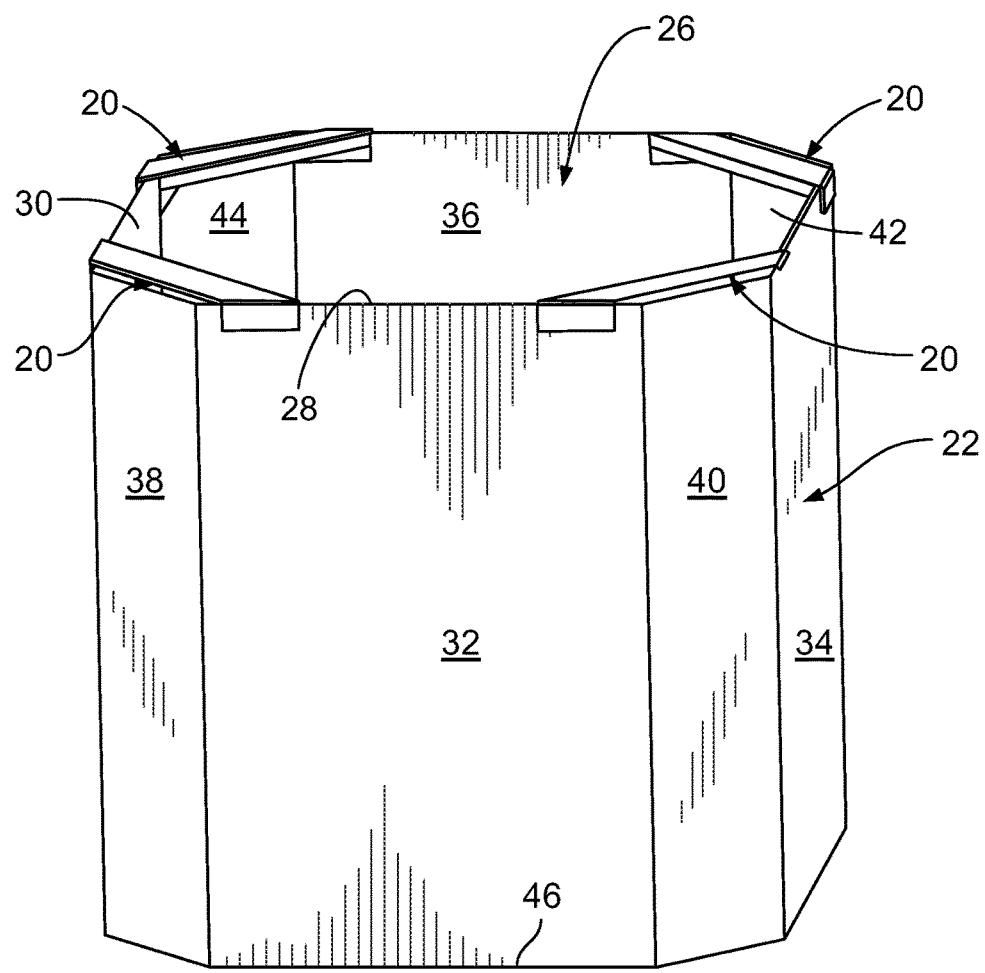
FIG. 13 is a perspective view of an example embodiment of a bulk bin having a plurality of the universal platforms mounted thereon.
Figure 14:
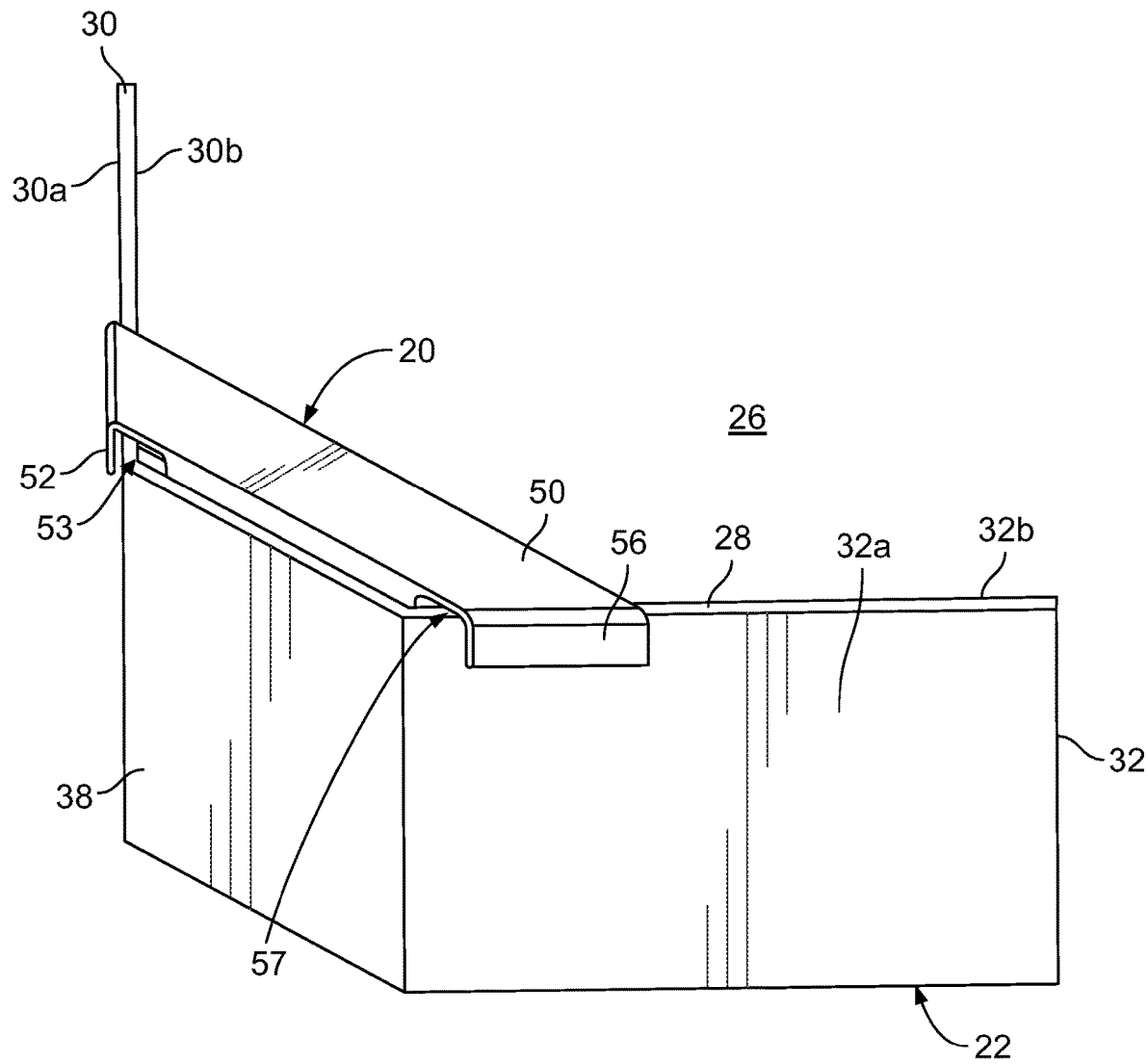
FIG. 14 is a partial perspective view of the bulk bin of FIG. 14, with one of the universal platforms mounted thereon.
Figure 19:
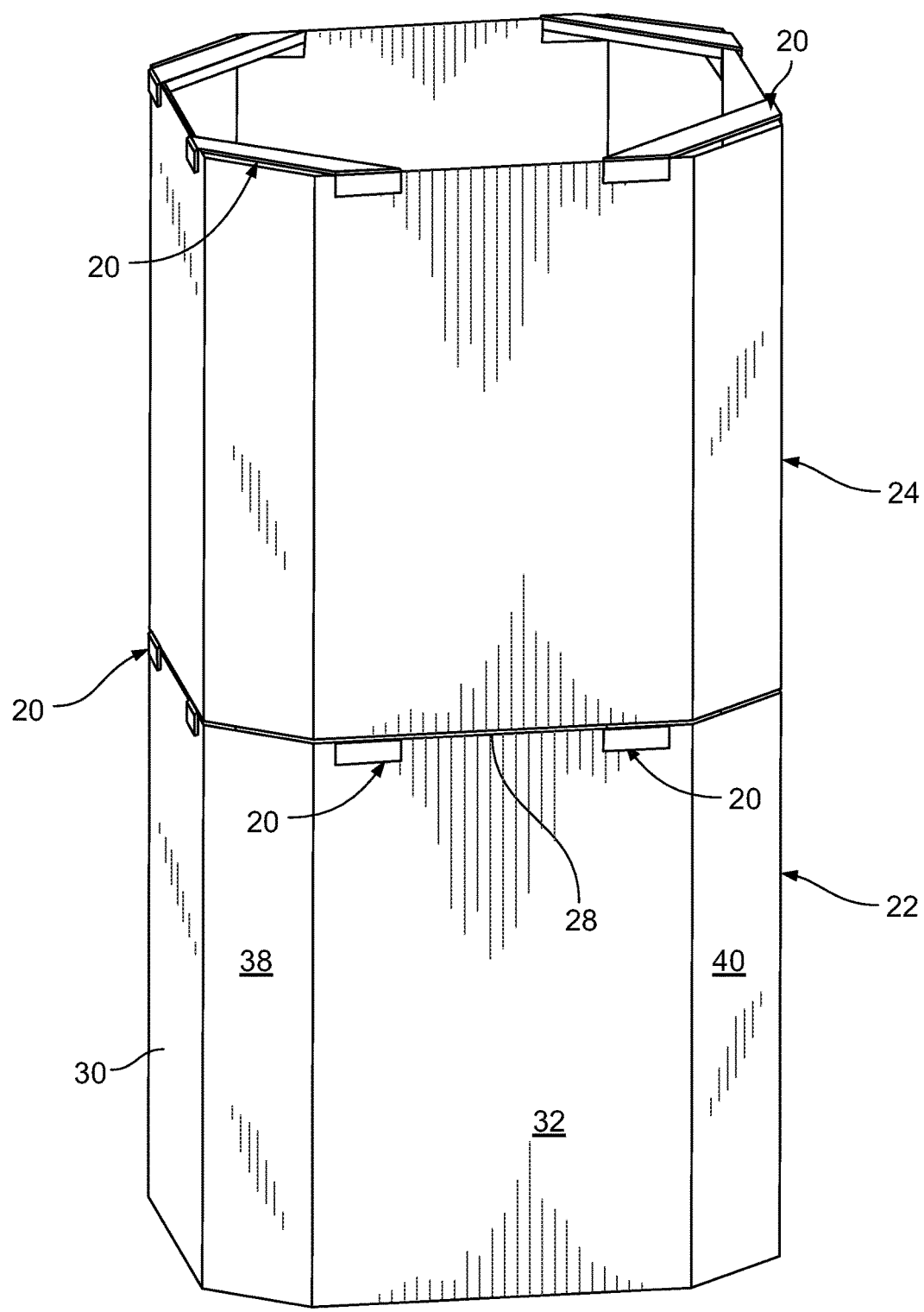
FIG. 19 is a perspective view of the bulk bin of FIG. 13 having a plurality of universal platforms mounted thereon, and in a stacked arrangement with another bulk bin mounted thereon.

In use, the universal platform 20 is easily seated on the upper rim 28 of the square, rectangular or octagonal bulk bin 22 by seating the universal platform 20 on two of the side walls which are transverse to each other. In the following discussion, the universal platform 20 is described with respect to being seated on side walls 30, 32, however, it is to be understood that this is for ease in description and the universal platform 20 can be seated on any of the side walls 30, 32, 34, 36. The inner surface 52b of the outer leg 52 faces the outer surface 30a of the side wall 30; the outer surface 54a of the inner leg 54 faces the inner surface 30b of the side wall 30. The spacing of the legs 52, 54 may provide for a tight fit of the side wall 30 therebetween, or the legs 52, 54 may be spaced such that there is a space between one or more of the legs 52, 54 and one or more of the surfaces 30a, 30b of the side wall 30. The lower surface 50b of the top wall 50 between the legs 52, 54 engages against the upper rim 28 formed by the side wall 30, or if the gripping protrusions 70 are provided then the gripping protrusions 70 engage against the upper rim 28. The side wall 30 seats within the channel 53 and extends through the open ends 53a, 53b and the open lower end of the channel 53 as shown in FIGS. 13 and 14. The inner surface 56b of the outer leg 56 faces the outer surface 32a of the side wall 32; the outer surface 58a of the inner leg 58 faces the inner surface 32b of the side wall 32. The spacing of the legs 56, 58 may provide for a tight fit of the side wall 32 therebetween, or the legs 56, 58 may be spaced such that there is a space between one or more of the legs 56, 58 and one or more of the surfaces 32a, 32b of the side wall 32. The lower surface 50b of the top wall 50 between the legs 56, 58 engages against the upper rim 28 formed by the side wall 32, or if the gripping protrusions 70 are provided then the gripping protrusions 70 engage against the upper rim 28. The side wall 32 seats within the channel 57 and extends through the open ends 57a, 57b and the open lower end of the channel 57 as shown in FIGS. 13 and 14. The top wall 50 spans the distance or corner formed between the side walls 30, 32 of the bulk bin 22. If the universal platform 20 is used with a bulk bin 22 that has corner side walls 38, 40, 42, 44, the outer edge 50d of the top wall 50 extends alongside the upper rim 28 formed by the corner side wall 38. The outer edge 50d may be spaced from the upper rim 28 formed by the corner side wall 38. The rounded lower ends 52c, 54c, 56c, 58c of the legs 52, 54, 56, 58 cause the upper rim 28 formed by the side walls 30, 32 of the bulk bin 22 to more easily enter between the legs 52, 54, 56, 58. Preferably, four universal platforms 20 are used in conjunction with a single square, rectangular or octagonal bulk bin 22 as shown in FIGS. 13-19; one on each corner. When the universal platform 20 is slid relative to the bulk bin 22, the dimension of the legs 52, 54, 56, 58 prevent the universal platform 20 from sliding too far inwardly along the side walls 30, 32 of the bulk bin 22, or too far outwardly along the side walls 30, 32 of the bulk bin 22. This provides a sliding lock action for the universal platform 20, in a forward movement and in a backward movement along the side walls 30, 32 of the bulk bin 22.

In use, the universal platform 20 is easily seated on the upper rim 128 of the circular side walled bulk bin 122 by seating the universal platform 20 on two parts of the side wall 130. The inner surface 52b of the outer leg 52 faces the outer surface 130a of the side wall 130; the outer surface 54a of the inner leg 54 faces the inner surface 130b of the side wall 130. The spacing of the legs 52, 54 may provide for a tight fit of the side wall 130 therebetween, or the legs 52, 54 may be spaced such that there is a space between one or more of the legs 52, 54 and one or more of the surfaces 130a, 130b of the side wall 130. The lower surface 50b of the top wall 50 between the legs 52, 54 engages against the upper rim 128 formed by the side wall 130, or if the gripping protrusions 68 are provided then the gripping protrusions 68 engage against the upper rim 128. The inner surface 56b of the outer leg 56 faces the outer surface 130a of the side wall 130; the outer surface 58a of the inner leg 58 faces the inner surface 130b of the side wall 130. The spacing of the legs 56, 58 may provide for a tight fit of the side wall 130 therebetween, or the legs 56, 58 may be spaced such that there is a space between one or more of the legs 56, 58 and one or more of the surfaces 130a, 130b of the side wall 130. The lower surface 50b of the top wall 50 between the legs 56, 58 engages against the upper rim 128 formed by the side wall 128, or if the gripping protrusions 68 are provided then the gripping protrusions 68 engage against the upper rim 128. The top wall 50 spans the distance formed between the parts of the side wall 130 of the bulk bin 122. The rounded lower ends 52c, 54c, 56c, 58c of the legs 52, 54, 56, 58 cause the upper rim 128 formed by the side wall 130 of the bulk bin 122 to more easily enter between the legs 52, 54, 56, 58. Preferably, two universal platforms 20 are used in conjunction with a single bulk bin 122 as shown in FIG. 20.

Once the desired number of the universal platforms 20 are seated on the upper rim 28, 128 of the bulk bin 22, 122, the object 24 can be stacked on top of the universal platform(s) 20. The upper surface 50a of the top wall 50 of each universal platform 20 engages the bottom surface of the bottom wall of the object 24. The top wall 50 prevents the object 24 from falling into the open top end 26, 126 of the lower bulk bin 22, 122.

The universal platforms 20 can be easily removed from the bulk bin 22, 122 by lifting the universal platforms 20 off of the upper rim 28, 128 of the bulk bin 22, 122.

The use of the universal platform 20 on a bulk bin 22, 122 provides a variety of benefits.

The object 24 may be longer or shorter front to rear, or wider or narrower left to right, than the lower bulk bin 22, 122. One to four of the universal platform 20 may be used on the lower bulk bin 22, 122, depending on the size of the object 24. The universal platform 20 deters degradation of the lower bulk bin 22, 122. Because degradation or failure is minimized or eliminated, the lower bulk bin 22, 122 can be reused repeatedly, thus increasing the life of the bulk bin 22, 122, or increased frequency of overall use of the bulk bin 22, 122. The universal platform 20 protects the entire upper rim 28, 128 of a bulk bin 22, 122 as the universal platform 20 causes the object 24 to rise above direct contact with the upper rim 28, 128. The universal platform 20 has weight bearing capabilities.

The assembly of the universal platform 20 with the bulk bin 22, 122 can be performed with one hand and has simple placement application that is easy to re-use and attach. The universal platform 20 does not require strapping, banding, tie-sheets, or angle boards. Removal of the universal platform 20 does not collapse the bulk bin 22, 122.

The universal platform 20 may be placed in a bulk bin 22, 122 that is full or is empty. The universal platform 20 can be used for shipping, storage, and/or handling purposes.

Since the upper surface 50a of the top wall 50 is devoid of protrusions, the universal platform 20 allows the object 24 to be stacked in a misaligned condition with the lower bulk bin 22, 122 or in an aligned condition with the lower bulk bin 22, 122. For inventory purposes, stored in a warehouse, multiple bulk bins 22, 122 are easily stacked to reasonably high heights using the universal platform 20. The universal platform 20 promotes safer storage, straighter stacks, and anti-racking capability.

The universal platform 20 easily enables the stacking of two bulk bins 22, 122, thus filling the height necessary to ship on a typical tractor-trailer or a high cube container. The universal platform 20 allows for common carriers to stack any type of palletized freight on top of bulk bins 22, 122, thereby increasing freight capacity and allowing for better loading and logistics management for tractor-trailer shipments.

The universal platform 20 may be used on a bulk bin 22, 122 that exists, not requiring assembly or re-assembly, and not dependent on the size of the bulk bin 22, 122. Assembled bulk bins 22, 122 will accept the universal platform 20.

The universal platform 20 may be used in bulk bins 22, 122 of varying wall thicknesses, from approximately 1 to 7 layers (approximately ⅛" to 2").

The universal platform 20 provides for more even weight distribution both vertically and horizontally of the object 24 on the lower bulk bin 22, 122.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A universal platform configured to be mounted to an upper rim of a bulk bin to enable a pallet or another bulk bin to be stacked directly thereon, comprising:
    a top wall having an inner edge, an opposite outer edge, opposite first and second side edges which extend between the inner edge and the outer edge, an upper planar surface defined between the edges, an opposite lower surface defined between the edges, a first centerline extending between the inner and outer edges, a second centerline extending between the side edges, the first centerline being transverse to the second centerline, wherein the upper planar surface is devoid of any protrusions which extend thereabove, the inner and outer edges being parallel to each other;
    a first pair of legs defined by a first outer leg having a first end and a second opposite end and extending downwardly from the lower surface of the top wall and a first inner leg having a first end and a second opposite end and extending downwardly from the lower surface of the top wall, the first outer leg being spaced from the first inner leg, wherein a first channel is defined between the first outer leg and the first inner leg and a portion of the top wall therebetween, the first channel having a first open end between the first ends of the first outer leg and the first inner leg, the first channel having a second open end between the second ends of the first outer leg and the first inner leg, and the first channel having an open lower end which is opposite to the top wall, the first outer and inner legs being parallel to each other, each of the first outer leg and the first inner leg extending an angle relative to the first centerline;
    a second pair of legs defined by a second outer leg having a first end and a second opposite end and extending downwardly from the lower surface of the top wall and a second inner leg having a first end and a second opposite end and extending downwardly from the lower surface of the top wall, the second outer leg being spaced from the second inner leg, wherein a second channel is defined between the second outer leg and the second inner leg and a portion of the top wall therebetween, the second channel having a first open end between the first ends of the second outer leg and the second inner leg, the second channel having a second open end between the second ends of the second outer leg and the second inner leg, and the second channel having an open lower end which is opposite to the top wall, the second outer and inner legs being parallel to each other, each of the second outer leg and the second inner leg extending at an angle relative to the first centerline; and
    the first inner leg and the second inner leg being proximate to each other, but spaced apart from each other.

2. The universal platform of claim 1, wherein the upper surface has a plurality of dimples therein.

3. The universal platform of claim 1, wherein the side edges extend at an angle relative to the first centerline.

4. The universal platform of claim 3, wherein the side edges extend at about a 45-degree angle relative to the first centerline.

5. The universal platform of claim 1, wherein the inner and outer edges are transverse to the first centerline, and parallel to the second centerline.

6. The universal platform of claim 1, wherein in each pair, the first and second legs are spaced apart from each other by 1.5 inches.

7. The universal platform of claim 1, wherein each leg terminates in a lower rounded end.

8. The universal platform of claim 1, wherein the first outer leg extends along the first side edge, and the second outer leg extends along the second side edge.

9. The universal platform of claim 1, further comprising a plurality of spaced apart stiffening ribs extending downwardly from the lower surface of the top wall.

10. The universal platform of claim 9, wherein the stiffening ribs extend between the first and second inner legs.

11. The universal platform of claim 10, wherein the stiffening ribs are parallel to the second centerline.

12. The universal platform of claim 10, wherein one of the stiffening ribs extends along the inner edge, and another one of the stiffening ribs extends along the outer edge.

13. The universal platform of claim 10, wherein each stiffening rib has a height which differs from a height of the legs.

14. The universal platform of claim 10, wherein the stiffening ribs form a grid.

15. The universal platform of claim 1, wherein the universal platform is formed of one of wood, plastic, metal, corrugated, ceramic and composite material.

16. The universal platform of claim 1, further comprising a plurality of spaced apart first protrusions extending across the first channel between the first pair of legs, each first protrusion having a height which differs from the height of the first pair of legs; and a plurality of spaced apart second protrusions extending across the second channel between the second pair of legs, each second protrusion having a height which differs from the height of the second pair of legs.

17. The universal platform of claim 1, in combination with a box having at least two side walls which are transverse to each other, the box having an open upper end forming an upper rim, wherein the universal platform seats on the upper rim and can be removed therefrom without damaging the box.

18. The universal platform of claim 1, in combination with a drum having a circular side wall, the side wall defining an open upper end forming an upper rim, wherein the universal platform seats on the upper rim.

19. The universal platform of claim 1, further comprising
    a plurality of spaced apart stiffening ribs extending downwardly from the lower surface of the top wall between the first and second inner legs, each stiffening rib having a height which differs from a height of the legs;
    a plurality of spaced apart first protrusions extending across the first channel between the first pair of legs, each first protrusion having a height which differs from the height of the first pair of legs; and a plurality of spaced apart second protrusions extending across the second channel between the second pair of legs, each second protrusion having a height which differs from the height of the second pair of legs.

20. The universal platform of claim 19, in combination with a box having at least two side walls which are transverse to each other, the box having an open upper end forming an upper rim, wherein the universal platform seats on the upper rim and can be removed therefrom without damaging the box.

21. The universal platform of claim 19, in combination with a drum having a circular side wall, the side wall defining an open upper end forming an upper rim, wherein the universal platform seats on the upper rim.

22. The universal platform of claim 1, wherein each of the first outer leg and the first inner leg extend at about a 45-degree angle relative to the first centerline and each of the second outer leg and the second inner leg extend at about a 45-degree angle relative to the first centerline.

\* \* \* \* \*